No. 668,989. Patented Feb. 26, 1901.
F. E. IVES.
PHOTOCHROMOSCOPIC APPARATUS.
(Application filed Dec. 11, 1899.)

(No Model.) 2 Sheets—Sheet 1.

Witnesses:—
Frank L. A. Graham.
Louis H. F. Whitehead.

Inventor:—
Frederic E. Ives.
by his Attorneys:—
Howson & Howson

No. 668,989. Patented Feb. 26, 1901.
F. E. IVES.
PHOTOCHROMOSCOPIC APPARATUS.
(Application filed Dec. 11, 1899.)

(No Model.) 2 Sheets—Sheet 2.

Witnesses:

Inventor:
Frederic E. Ives.
by his Attorneys
Howson & Howson

UNITED STATES PATENT OFFICE.

FREDERIC EUGENE IVES, OF PHILADELPHIA, PENNSYLVANIA.

PHOTOCHROMOSCOPIC APPARATUS.

SPECIFICATION forming part of Letters Patent No. 668,989, dated February 26, 1901.

Application filed December 11, 1899. Serial No. 739,959. (No model.)

*To all whom it may concern:*

Be it known that I, FREDERIC EUGENE IVES, a citizen of the United States, residing in Philadelphia, Pennsylvania, have invented certain Improvements in Photochromoscopic Apparatus, of which the following is a specification.

The object of my invention is to provide a simple form of instrument capable for use either as a camera for producing color-records of objects or as a photochromoscope for viewing chromograms made from such color-records.

When used as a camera, the instrument produces at a single exposure from a single point of view and upon a single sensitive plate or upon a series of such plates disposed side by side in the same plane a set of three images which are identical in size and perspective, but which contain differences in gradations of shade, which constitute a color-record for use in the processes of composite color-photography.

When used as a photochromoscope, the instrument provides a means for optically blending three images in perfect register in order to form to the eye a reproduction in colors of the image viewed.

Figure 1:
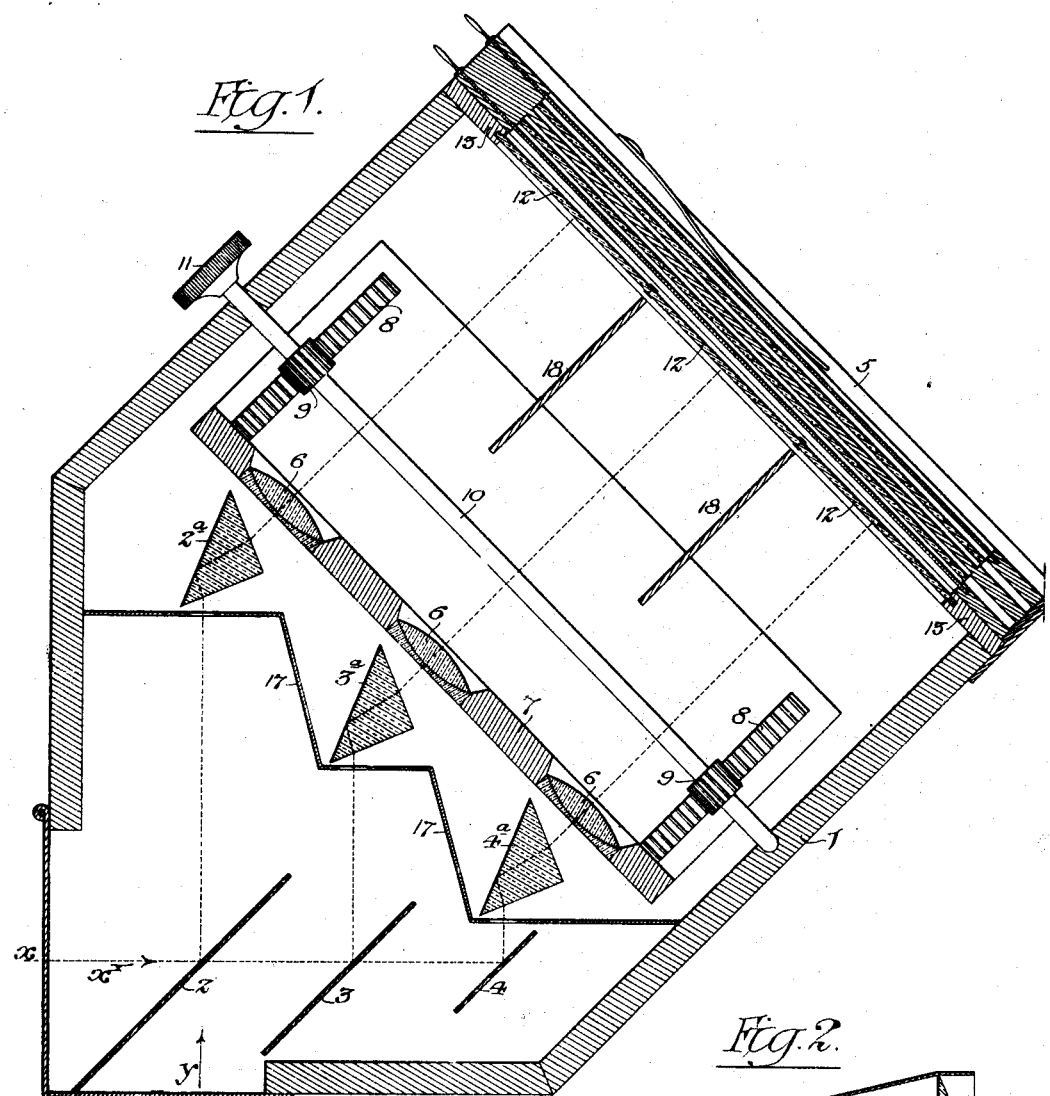
Figure 2:
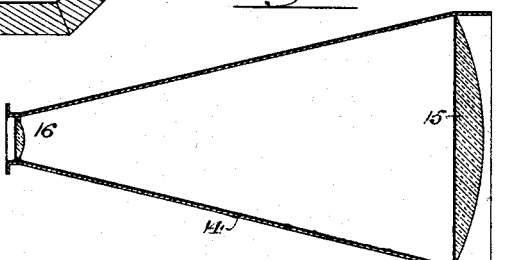
Figure 4:
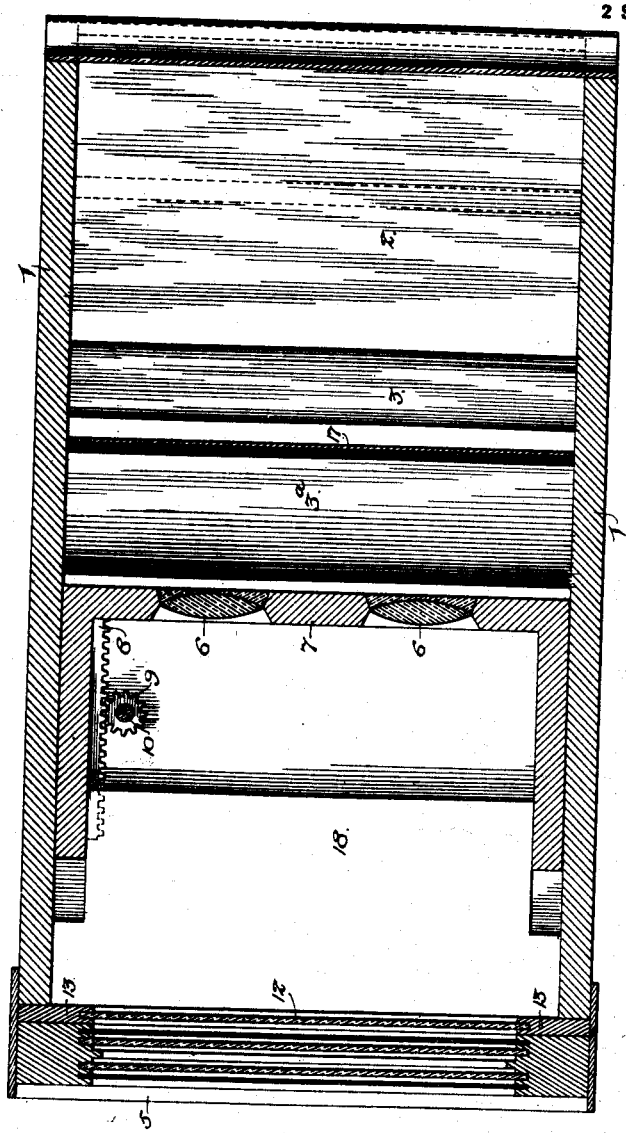
Figure 5:
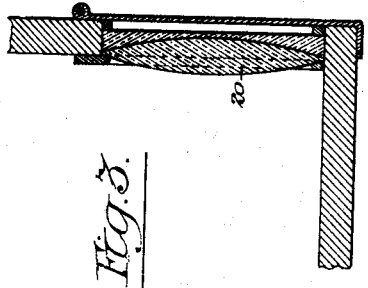

In the accompanying drawings, Figure 1 is a sectional view of a camera constructed in accordance with my invention. Fig. 2 is a view of an eyepiece which may be employed when the instrument is used as a photochromoscope. Fig. 3 is a section of part of the instrument, illustrating a modification of the invention; and Fig. 4 is a transverse section of the instrument shown in Fig. 1, illustrating the latter as binocular or stereoscopic.

The casing 1 of the instrument has an opening at $x$, so that the axial ray from the object takes the course indicated by the line $x'$. In the path of this axial ray are interposed three reflectors 2, 3, and 4, the reflectors 2 and 3 being transparent, so that they will reflect portions of the rays impinging upon them and transmit the remaining portions of the rays, whereby an image will be reflected from each of said reflectors 2, 3, and 4 in a direction at right angles to the line of the axial ray $x'$. These reflected rays are caught and again reflected by a second series of reflectors $2^a$, $3^a$, and $4^a$, these second reflectors consisting by preference of rectangular prisms silvered on the side, which constitutes the hypotenuse of the triangle. The second set of reflectors is disposed in a line which is diagonal in respect to the line of the primary reflectors 2, 3, and 4, and the angle of said secondary reflectors $2^a$ $3^a$ $4^a$ is such in respect to the angle of the primary reflectors 2, 3, and 4, and the axial rays received by said secondary reflectors will be reflected in a line diagonal to that of the primary reflectors, but in the same plane, whereby said second reflected rays will be received by a sensitive plate or plates disposed in the same plane as the primary reflectors 2, 3, and 4, but oppositely diagonal to the line of said reflectors. In the present instance the plate-holder 5 is at an angle of forty-five degrees in respect to the axial ray $x'$, the secondary reflectors $2^a$, $3^a$, and $4^a$ being at an angle of sixty-seven and one-half degrees in respect to said axial rays.

There may be a single lens at the opening $x$ of the camera, as shown at 20, Fig. 3; but I prefer to employ a series of three lenses 6, one for each reflected image, said lenses being located between the sensitive plate and the secondary reflectors $2^a$, $3^a$, and $4^a$. These lenses may be mounted in a frame 7, which has racks 8, engaging with pinions 9 on a transverse shaft 10, having a suitable knob or handle 11 on the exterior of the camera-box, so that the lenses may be readily adjusted for focusing purposes.

The three color-screens 12 may be disposed at any point in the path of the rays after the latter have been divided by the primary reflectors 2, 3, and 4, the preferable plan being to mount these color-screens in a frame which can be inserted in front of the plate-holder 5. This arrangement permits of having a different set of screens for taking and viewing, the screens being mounted in interchangeable frames.

Instead of the axial ray from the object entering the camera in the direction of the line $x'$ it may enter the same in a direction at right angles thereto—that is to say, in the direction of the arrow $y$—the optical result being the same, except that the image is reversed.

When the instrument is used as a photochromoscope, a chromogram takes the place of the sensitive plate and the direction of the rays of light is the reverse of that which I have just described, the point *x* or *y* becoming the viewing-point, and in such case an eyepiece of the character shown in Fig. 2 may be used, said eyepiece consisting of a casing 14, having a pair of convex lenses 15 and 16.

In an application for patent filed by me on the 7th day of October, 1899, Serial No. 732,915, I have described a camera having a set of primary reflectors inclined one behind another in the same line, two of these reflectors being transparent and the set of reflectors being used in combination with a set of secondary reflectors disposed diagonally to the first set; but said secondary reflectors were arranged to reflect the images onto a sensitive plate or plates disposed in a different plane from the primary reflectors, and this necessitated the use of a camera-box comparatively large in size and awkward in shape. These objections are overcome in my present instrument, in which the sensitive plate occupies the same plane as the reflectors, and, furthermore, a camera constructed in accordance with my present invention can readily be made stereoscopic by duplicating the lenses 6 and lengthening or duplicating the reflectors, color-screens, and sensitive plate or plates, as shown, for instance, in Fig. 4.

A diaphragm-plate 17 is preferably interposed between the primary and secondary reflectors, this diaphragm-plate having an aperture for each of the reflected images, and partitions 18 are employed for preventing the overlapping of the images.

Having thus described my invention, I claim and desire to secure by Letters Patent—

1. In photochromoscopic apparatus, the combination of a casing, means for projecting an image, a series of inclined primary reflectors disposed one behind another in the same line, two of said reflectors being transparent, and a series of secondary reflectors disposed one behind another in a line which is diagonal to that of the primary reflectors, each secondary reflector being inclined at an angle different from that of its corresponding primary reflector and in the same plane.

2. In photochromoscopic apparatus, the combination, of a casing, means for projecting an image, a series of inclined primary reflectors disposed one behind another in the same line, two of said reflectors being transparent, and a series of secondary reflectors disposed one behind another in a line diagonal to that of the primary reflectors, said secondary reflectors being so inclined that the reflected axial light-rays proceed therefrom in lines diagonal to the primary optic axis but in the same plane.

3. In photochromoscopic apparatus, the combination of a casing, means for projecting an image, a series of inclined primary reflectors disposed one behind another in the same line, two of said reflectors being transparent, and a series of secondary reflectors arranged one behind another in a line which is diagonal to that of the primary reflectors, said secondary reflectors being so inclined that the reflected light-rays proceed in a direction diagonal to the line of the primary reflectors and perpendicular to a plane which is oppositely diagonal to said line.

4. In photochromoscopic apparatus, the combination of a casing, means for projecting an image, a series of inclined primary reflectors disposed one behind another in the same line, two of said reflectors being transparent, a series of secondary reflectors arranged one behind another in a line which is diagonal to that of the primary reflectors, each of said secondary reflectors being inclined at an angle different from that of its corresponding primary reflector, and an apertured diaphragm disposed between each primary reflector and its corresponding secondary reflector.

5. In photochromoscopic apparatus, the combination of a casing, a series of inclined primary reflectors disposed one behind another in the same line, two of said reflectors being transparent, a series of secondary reflectors arranged one behind another in a line which is diagonal to that of the primary reflectors, each of said secondary reflectors being inclined at an angle different from that of the corresponding primary reflector but in the same plane, and a series of lenses disposed in the path of the rays reflected by said secondary reflectors.

6. In photochromoscopic apparatus, the combination of a casing, a series of inclined primary reflectors disposed one behind another in the same line, two of said reflectors being transparent, a series of secondary reflectors arranged one behind another in a line which is diagonal to that of the primary reflectors, each of said secondary reflectors being inclined at an angle different from that of the corresponding primary reflector but in the same plane, and a series of lenses disposed in the path of the rays reflected by said secondary reflectors and adjustable from and toward said reflectors.

7. In photochromoscopic apparatus, the combination of a casing, means for projecting an image, a series of color-screens, a series of inclined reflectors disposed one behind another in the same line, two of said reflectors being transparent, and a second series of reflectors disposed one behind another in a line which is diagonal to that of the first series, said second series of reflectors being so inclined that the reflected axial light-rays proceed therefrom in lines diagonal to the primary optic axis but in the same plane.

In testimony whereof I have signed my name to this specification in the presence of two subscribing witnesses.

FREDERIC EUGENE IVES.

Witnesses:
F. E. BECHTOLD,
JOS. H. KLEIN.